(12) United States Patent
Erickson (10) Patent No.: US 10,905,051 B2
(45) Date of Patent: Feb. 2, 2021

(54) INTEGRATED, SELF SUPPORTING ELEVATED GAS DELIVERY TUBE AND LED LIGHT FOR CROP FOLIAGE

(71) Applicant: Stewart E. Erickson, Hudson, WI (US)

(72) Inventor: Stewart E. Erickson, Hudson, WI (US)

(73) Assignee: The Agricultural Gas Company, Petaluma, CA (US)

( * ) Notice: Subject to any disclaimer, the term of this patent is extended or adjusted under 35 U.S.C. 154(b) by 18 days.

(21) Appl. No.: 16/047,552

(22) Filed: Jul. 27, 2018

(65) Prior Publication Data

US 2019/0029186 A1 Jan. 31, 2019

Related U.S. Application Data

(60) Provisional application No. 62/537,488, filed on Jul. 27, 2017.

(51) Int. Cl.
| | | |
|---|---|---|
| A01G 7/04 | (2006.01) | |
| A01G 17/00 | (2006.01) | |
| A01G 7/02 | (2006.01) | |
| F21V 15/01 | (2006.01) | |
| F21V 19/00 | (2006.01) | |
| F21S 4/26 | (2016.01) | |
| A01G 9/24 | (2006.01) | |
| F21Y 115/10 | (2016.01) | |
| F21Y 103/10 | (2016.01) | |

(52) U.S. Cl.
CPC ............... *A01G 7/045* (2013.01); *A01G 7/02* (2013.01); *A01G 9/249* (2019.05); *A01G 17/00* (2013.01); *F21S 4/26* (2016.01); *F21V 15/01* (2013.01); *F21V 19/0015* (2013.01); *F21Y 2103/10* (2016.08); *F21Y 2115/10* (2016.08)

(58) Field of Classification Search
USPC .......................................................... 362/96
See application file for complete search history.

(56) References Cited

U.S. PATENT DOCUMENTS

| | | | | |
|---|---|---|---|---|
| 6,874,707 B2* | 4/2005 | Skinner | ................... | A01G 25/16 239/542 |
| 7,982,378 B2* | 7/2011 | Rooymans | ............. | A01G 7/045 313/44 |
| 8,756,858 B2* | 6/2014 | Krabbendam | ........... | A01G 7/02 47/17 |
| 9,480,207 B2* | 11/2016 | Tanase | ................... | A01G 7/045 |
| 9,894,844 B2* | 2/2018 | Takashima | ............... | A01G 7/02 |
| 2009/0039752 A1* | 2/2009 | Rooymans | ............. | A01G 7/045 313/36 |
| 2011/0179705 A1* | 7/2011 | Sinda | ..................... | A01G 25/02 47/48.5 |

(Continued)

*Primary Examiner* — Rodney E Fuller
(74) *Attorney, Agent, or Firm* — Skinner and Associates; Joel D. Skinner, Jr.

(57) ABSTRACT

An integrated, self supporting elevated gas delivery and light emitting system for crops. The system has a gas and light line that is made of an elongated, tubular body having a central, longitudinal lumen and a plurality of apertures extending from the lumen through the body. The lumen conveys a gas and the apertures emit gas from the lumen to the plant foliage. A plurality of light emitting diodes are fixedly coupled to an exterior surface of the tubular body. A conductor is fixedly coupled to the tubular body and conductively connected to the plurality of light emitting diodes.

7 Claims, 6 Drawing Sheets

(56) References Cited

U.S. PATENT DOCUMENTS

2013/0000185 A1\* 1/2013 Tanase ................ A01G 7/045
  47/17
2016/0198640 A1\* 7/2016 Singh .................. A01G 25/09
  362/96
2018/0000024 A1\* 1/2018 Erickson .............. A01G 17/06

\* cited by examiner

INTEGRATED, SELF SUPPORTING ELEVATED GAS DELIVERY TUBE AND LED LIGHT FOR CROP FOLIAGE

CROSS-REFERENCE TO RELATED APPLICATIONS, IF ANY

This application claims the benefit under 35 U.S.C. § 119(e) of U.S. Provisional Patent Application Ser. No. 62/537,488, filed Jul. 27, 2017, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to agricultural systems, apparatus and methods. Particularly, the invention relates to a system of delivering gases and light to crops. Most particularly, the invention relates to an integrated, self-supporting gas delivery and LED lighting system for crops.

2. Background Information

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides an agricultural system, apparatus, and method which are beneficial, practical, reliable, and efficient, and which are believed to fulfill the need and to constitute an improvement over the background technology.

In one aspect, the invention provides an integrated gas delivery and light emitting line adapted to be placed in the foliage of one or more plants to facilitate growth, comprising an elongated, tubular body having a central, longitudinal lumen and a plurality of apertures extending from the lumen through the body, the lumen being adapted to convey a gas and the apertures being adapted to emit gas from the lumen to the plant foliage;

a plurality of light emitting diodes fixedly coupled to an exterior surface of the tubular body; and a conductor fixedly coupled to the tubular body and conductively connected to the plurality of light emitting diodes.

In another aspect, the invention provides an integrated $CO_2$ gas delivery and light emitting line adapted to be placed horizontally and in an elevated position in the foliage of a plurality of plants to facilitate growth, comprising:

a. an elongated, tubular inner body having a central, longitudinal lumen, the inner body being constructed of Graphene;

b. an outer body disposed around the inner body and constructed of polyethylene, the inner body and outer body having a plurality of apertures extending from the lumen there through to the exterior of the line, the lumen being adapted to convey a gas and the apertures being adapted to emit gas from the lumen to the plant foliage;

c. a plurality of light emitting diodes fixedly coupled to an exterior surface of the outer body and conductively connected to the inner body.

d. gas source communicatively connected to the lumen of the tubular body, and e. a power source communicatively connected to the conductor.

The aspects, features, advantages, benefits and objects of the invention will become clear to those skilled in the art by reference to the following description, claims and drawings.

DETAILED DESCRIPTION

The present invention provides a device and method for delivering enriched gaseous medium, such as $CO_2$ enriched gas, oxygen deprived gas, thermally treated air, or pheromones, to seasonal vegetable crops grown in beds (such as peppers and fresh market tomatoes) and to permanent crops grown in hedgerows like tea, coffee, viticultural practices (raisins, wine or table) or orchards, notably trees grown in hedgerows like mandarin oranges that may require or desire a vertical trellis or staking. The gas or gasses are delivered to the vertically supported vines through a stake or trellis that incorporates an annular space dedicated tube for gas vertical deliveries to foliage supported by the device.

Figure 1:
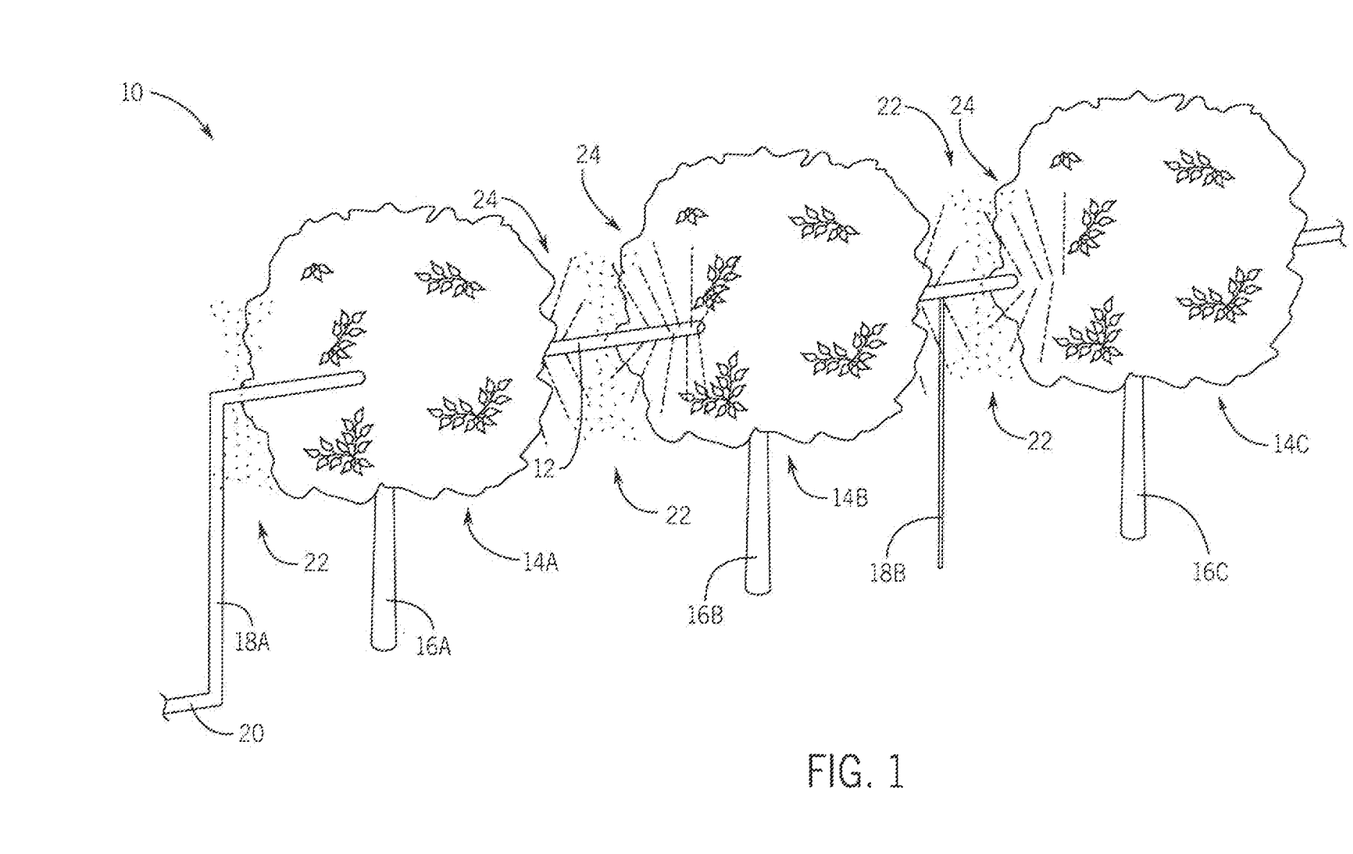
FIG. 1 illustrates an embodiment of the integrated, self supporting gas delivery and light emitting system of the invention, operatively deployed in an orange orchard.
Figure 4A:
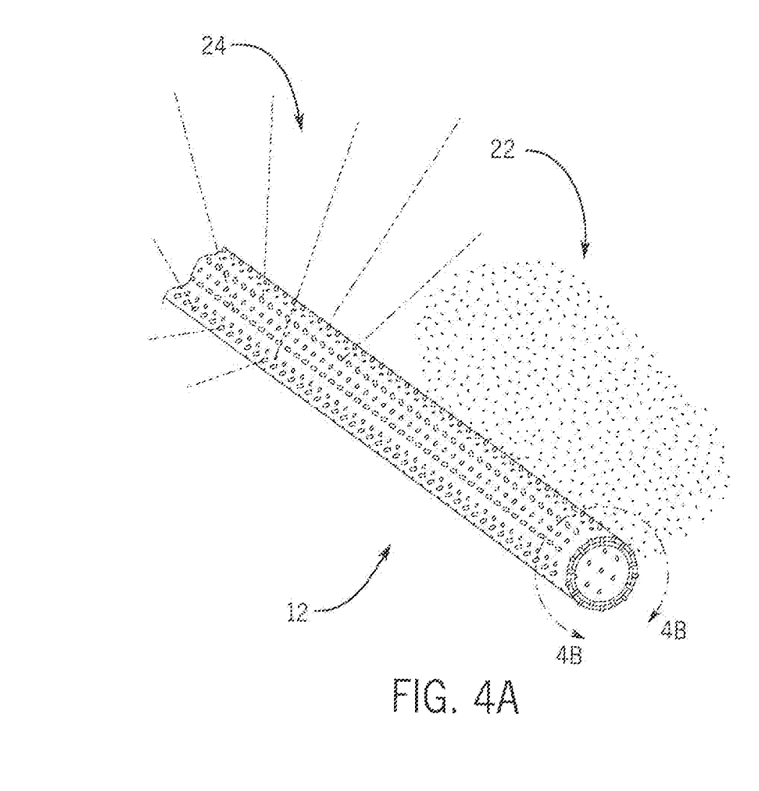
FIG. 4A is a perspective view of a portion of an integrated gas delivery and LED light emitting tube.
Figure 4B:
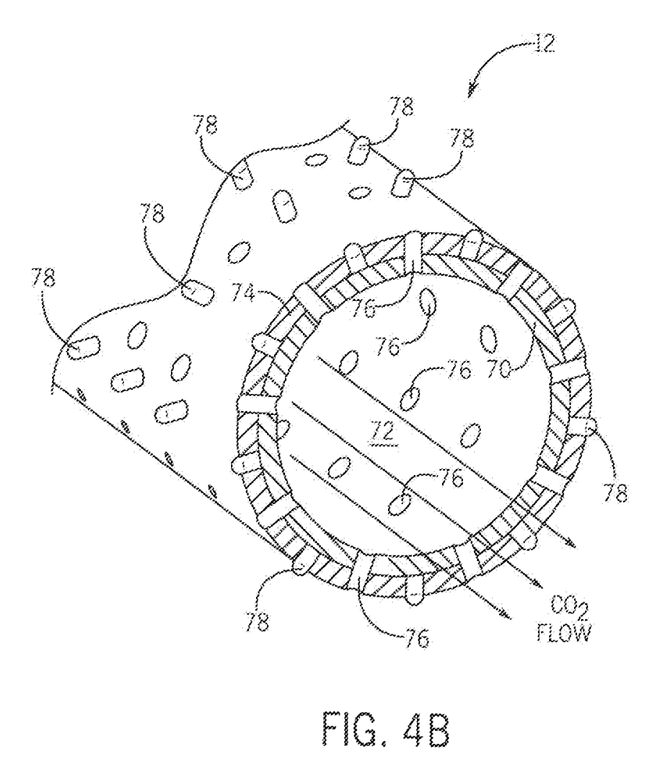
FIG. 4B is a detailed, crossectional view of the tube.
Figure 5:
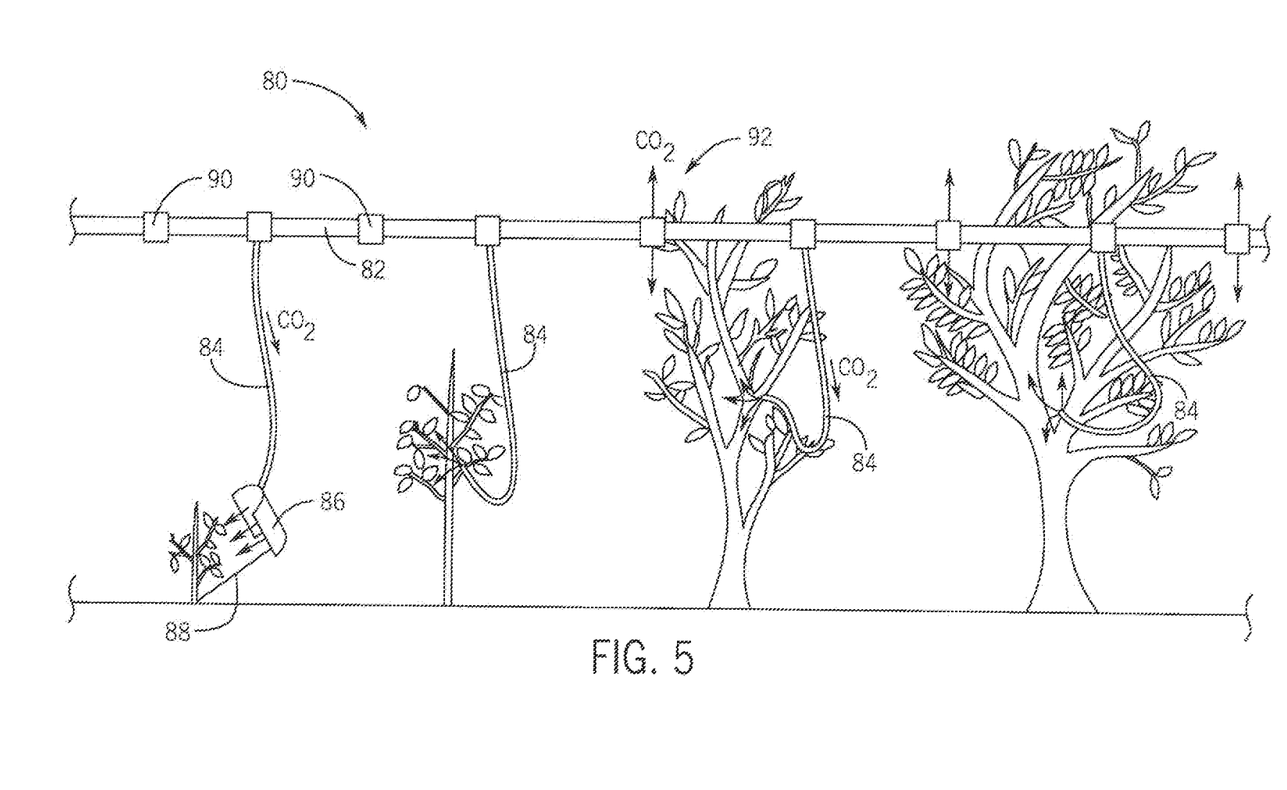
FIG. 5 is a front, elevation view of one line of the elevated gas delivery tube without light emission disposed on a row of trees.
Figure 6:
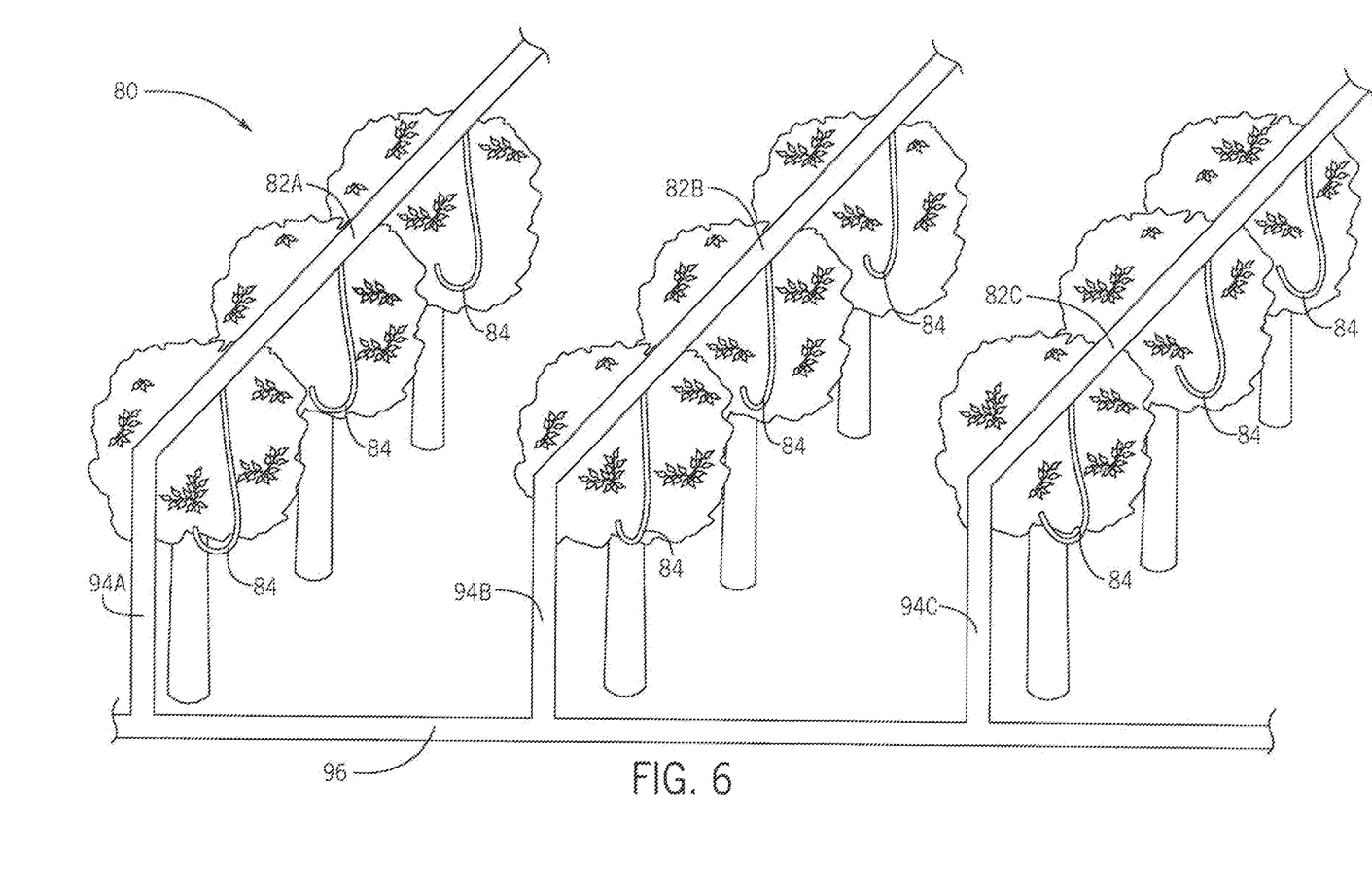
FIG. 6 is an isometric view of the elevated gas delivery tube system of FIG. 5, with a plurality of lines disposed in rows of the orchard.

FIG. 1 illustrates an embodiment of the integrated, self, elevated supporting gas delivery and light emitting system 10 of the invention, operatively horizontally deployed in an orchard; in this case a grove or orange trees. The system 10 includes a delivery tube or line 12 located above ground and disposed in the upper foliage 14 of trees 16. The tube 12 is supported by at least one and preferably plural supports 18. A gas and power supply line 20 supplies at least one gas and power to the line 12. The supply line 20 may extend up the first support 18A on its outside to connect with the line 12. Alternatively, the line 20 may connect to an internal or external support conduit or conduits. The delivery tube 12 has a plurality of gas emission apertures or ports (See FIG. 4) delivering one or more gasses 22, and a plurality of light (preferably LED) emission elements (also See FIG. 4) for emitting light 24 to the plant foliage.

Figure 2:
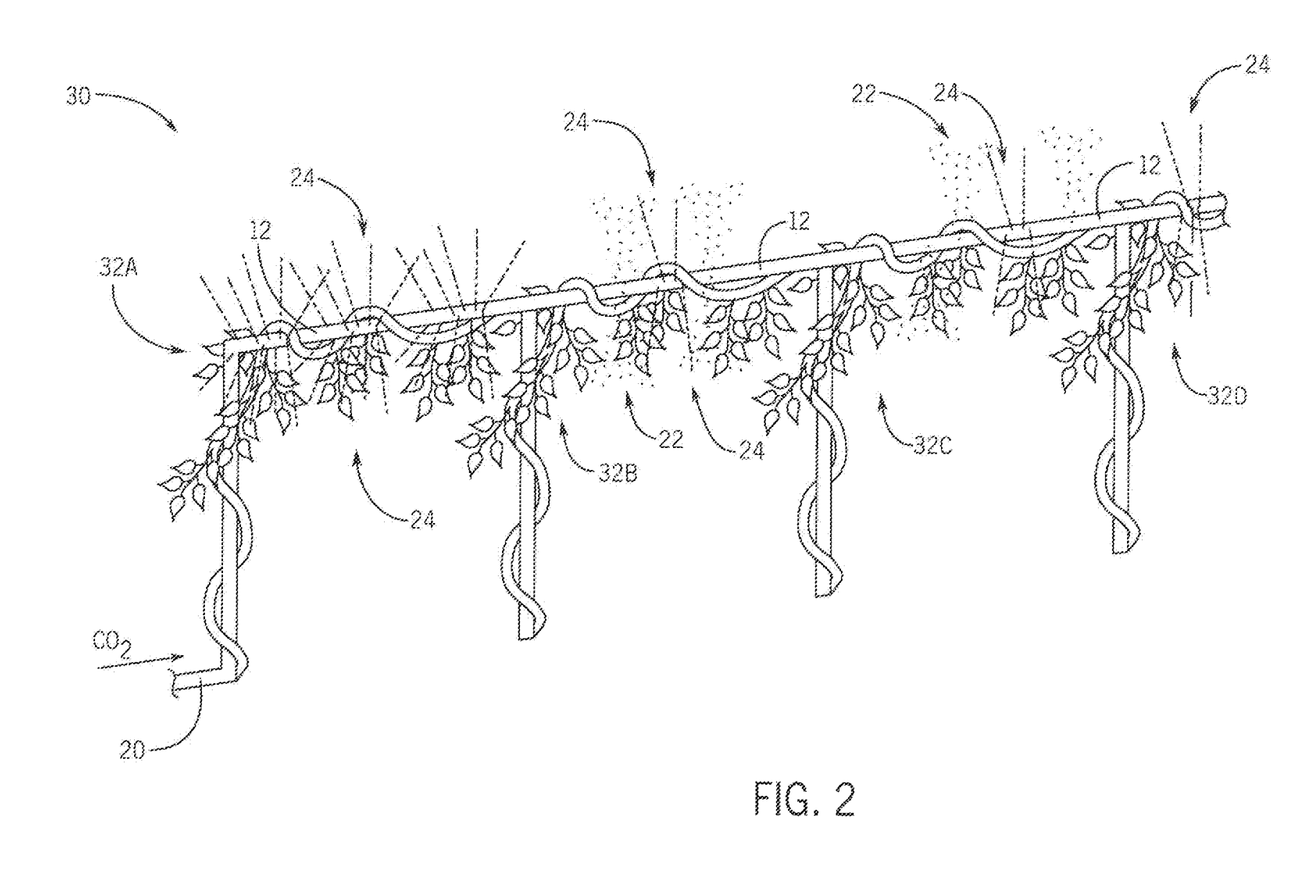
FIG. 2 illustrates an embodiment of the system deployed in a grape vineyard.

FIG. 2 illustrates an embodiment of the integrated, elevated, self supporting light and gas system 30 comprising substantially the same elements of the light and gas delivery system 10 shown in FIG. 1, deployed in a grape vineyard consisting of grape vines 32.

Figure 3:
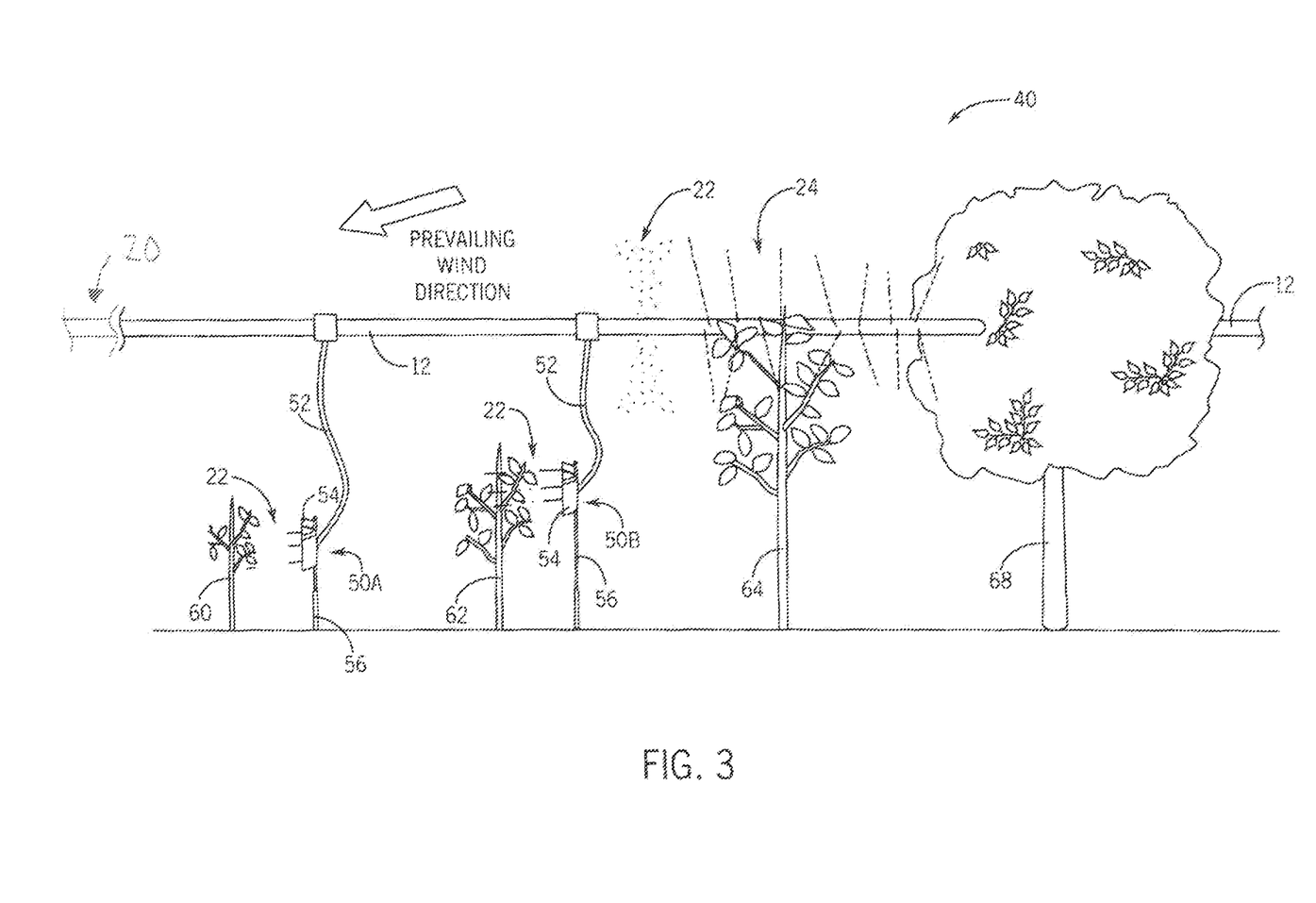
FIG. 3 illustrates an embodiment of the system of FIG. 1 combined with a plurality of ground gas wind shield emitters.

FIG. 3 illustrates an alternative embodiment of the elevated, self supporting, integrated light and gas delivery system 40 (also including substantially the same elements as the prior to Figures) combined with a plurality of ground based $CO_2$ wind shield emitters 50. An example of a wind shield $CO_2$ emitter 50 is disclosed in Applicant's pending U.S. patent application Ser. No. 15/153,038, filed May 12, 2016 entitled Arial Fluid Application Technology for Orchards, Vineyards and the Like, which is hereby incorporated by reference. The ground/shield emitters 50 are communicatively connected with respect to gas and power of the elevated horizontal tube 12 by connector tubing 52. The emitters 50 each have a wind blocking cup or foil 54 and a telescoping stake 56. This permits adjustment of the emitter 50 height as trees mature from seedling 60, to immature plant 62, to sapling 64 to mature tree 68 over time. The emitter 50 cup may be removed as the sapling 64 reaches full height. The foil 54 is oriented up wind of the plants 60-68 to block wind from blowing away gas 22 that is emitted on the downwind side of the foil 54. The elevated line 12 may move with the plants as they grow or be manually adjusted or reinstalled.

FIG. 4A is a perspective view of a portion of an integrated gas 22 delivery and LED light 24 emitting tube 12 that is disposable horizontally in an elevated position directly in the foliage of a plant. The tube 12 has a circular (in crossection) configuration and is constructed of a rigid inner body 70 which surrounds a hollow central lumen 72, and a outer body 74 constructed of plastic (preferably polyethylene). Gas 22 is communicated through the lumen 72. A plurality of gas emission apertures or pores 76 extend from the lumen 72 through both the inner body 70 and the outer body 74 to the exterior environment. The inner body 70 is constructed of rigid Graphene. Graphene is an electrically conducting material and this is used to conduct power along the line 12. A plurality of LED elements 78 are disposed on the exterior of the tube 12, the bases of which are electrically connected to the inner body 70. The tube FIG. 4B is a detailed crossectional view of the tube. The horizontal length of the integrated line 12 plastic tube 12 usually polyethylene tubing may have graphene impregnated into the extruded plastic down its length in entirety giving the tube 12 sufficient tensile strength so as to be self-supporting. Alternatively, a conductive wire (not shown) may be used to support the tube and/or to create a trellis for the vine or crop to attach to. The graphene or electrical conducting material also acts as the electricity transmission conduit to illuminate the LED diodes 78 down the entire length of the tube 12.

In the orchard industry, typically micro sprayers are used to cover and area of soil to promote widespread root growth of the trees, which is favorable for the good health of the trees. In the invention both the light and enriched gas ($CO_2$, thermally treated air, pheromones or the like) are delivered more closely to the canopy/foliage of the vertical foliage supported by a trellis or stake, comparatively to irrigation tubes that deliver water to the ground. When orchards are planted with saplings/juvenal tress there the foliage of the trees occupies a very small percentage of the overall acreage of the orchard or vineyard, because the saplings and/or juvenile crop have to be planted at great intervals to allow proper spacing whence the trees/crops grow to maturity and have extensive foliage canopies. Therefore, the invention includes a support trellis and/or stake that has an annular space to conduct gas for emission immediately adjacent to the foliage of the crop and integrated LED lights. The gas 22 and light 24 are emitted directly at the foliage rather that at ground level and allowed to disperse through the field. Further, since the foliage is elevated and continues to move upward with growth, from year to year for permanent crops, it is desirable to install the integrated gas and light supply tube 12 in a vertically position to a future desired height in the crops future foliar canopy, and then provided a drop down flexible "spaghetti pipe" or the like with one or more emitters downward to the juvenile plant which is closers to the ground therein desirably releasing the gas directly to the area of the saplings' foliage, for example a young grape vine start. In the preferred embodiment, a gas and light supply line would be installed at an elevated position above the early stage foliar canopy and would have many emitters and diodes located along the entire length of the installation, but these emitters and diodes would be shut off/plugged with a removable plug during the juvenile years when the foliar canopy is below this supply line. A drop down tube would be installed directly above each juvenile plant, and be downwardly depending providing the proper length to reach from the elevated supply line down to the foliar leafy area of the juvenile plant. This drop down with one or more emitters and light emitting LED diodes 78 is desirably adjusted on an annual or semiannual bases, to emit $CO_2$, other beneficial gases 22 and light 24 at corrected heights and length and emission rate to "match" the crop as it attains vertical leafy growth and leafy canopy dimension. This can be accomplished by either retracting the tube upward, "J-Hooking" the tube, shortening it by cutting it to length, or restricting gas flow from the lower portion from the bottom up through rolling the tube up, capping, pinching or the like, below the leafy area. Additional emitters can be opened up to if the dimension of the canopy expands so that the gas will mirror and adjacently flow to the elevated leafy canopy. Eventually the drop down tube may be maybe desirably removed all together, when the foliar canopy reaches to main horizontally suspended supply line, like for grapes which then grow horizontally with little if any sub-canopy structure, or in the care of hedgerows crops it can be desirable to continue to release some gas and light into the lower canopy. These are commonly used in the orchard industry, vineyards, growing tomatoes or other crops that need vertical support. In the preferred embodiment, the emitter orifices 76 from the annular space 72 could be vertically arranged in either an open or closed position to accommodate different growth heights of the crops foliage. That is when the seedling is started and staked up the lower orifices would be opened and upper orifices would be closed thereby conserving gaseous emissions and pumping costs. As the crop matures and grows vertically upper orifices are opened adjacent to the foliage and lower orifices might be left open or closed, whichever, is most efficient for foliage exposure to gas enrichment.

Then, as in the case of vine crops that are trained to grow horizontally along a wire like vineyards, horizontal orifices are opened down the length to match the leafy area when the vines drape themselves horizontally as is preferred in mature grape production. This puts gas and light emissions in immediate proximity to crops' foliage where it is needed and desired to stimulate crop production. In the preferred embodiment one or more integrated supply lines are attached to the top wires of a wine trellis or orchard trellis.

The device and method may be used in conjunction with an Aerial Application manufactured and sold by AGGas of Hudson, Wis., USA, as the supply to the wind foils only in this case the supply would come from above. This would be desirable also because it would hold the drop down tube in a steady position not be blown by the wind. And, the wind foils act as a housing unit contain illuminating LED diodes that face the sapling tree or the likes, to further enhance the growth.

The drop down tube should be rigid or tethered so as not to be blown out of its upwind emitter position in relationship to the leafy canopy The invention has many benefits. Trucks deliveries of $CO_2$ are typically three times as expensive as gas via pipeline, so would cost substantially less. The method should conserve significant amounts of costly $CO_2$ get more $CO_2$ to the seedlings and crop foliage for use, utilize and existing orchard, vineyard and crop accepted devices, conserve a lot of pumping energy for pumping gas that would otherwise disperse into the atmosphere. The method should conserve a lot of costly gas. And, the method is agronomically correct for existing farming functions without disruption to the farmers. This allows gas to get to the elevated leafy canopy that is fully exposed to sunlight which is where most of the photosynthesis occurs.

Viticultural practices require some 30 or more miles of wire per 640 acre section. The present invention eliminates or reduces the need for wire, while gaining increased crop production. It is well known in the sciences the plants can increase crop growth with additional light in certain bandwidths/colors and through increased duration of light. This is common practice in greenhouse. However, to date it has been inefficient and uneconomical to add light in the outdoor environs where most crops are grown. Further it is well know that crops in the major production areas "shut down" for large portions of the daylight growing hours due to extreme high temperatures like California. Therefore, it is desirable to take advantage of the plantings and conducive temperature during morning and evening hours to stimulate crop production by introducing light into the equation.

The present invention provides and integrated system for both gas 22, light 24 (and potentially other fluids such as water with our without additives) to provide economic cost efficiencies so that growers can take advantage of this opportunity to reduce water, make land more productive and grow healthier crops.

Pivot irrigation uses drop down tubes for the delivery of water. While not completely dissimilar in appearance, that product is completely deficient for watering of grapes, orchards etc., and the gas has to be continuously delivered over the entire acres in a grid work of permanently installed supply lines not a single row mobile wheeled irrigation systems. Would allow direct application of $CO_2$ to the foliage of saplings and juvenile vines as they grow vertically. Growth of these immature trees is very essential and the economics would be greatly enhanced if the new orchard, vineyards and crops could be brought into greater production at an earlier date. Further, because the young orchards, vineyards and crops have to provide wide spacing between the seedlings and the soil/ground is very susceptible to wind and heat from direct sunlight, which furthers water losses, which is costly, and can stress the immature plants. New seedlings are also more susceptible to mortality; drought, disease, etc. so by "pampering" the saplings with $CO_2$ the overall economics off the orchard industry can be greatly increased.

Once mature crops have specific spacing and some are open grown wither for mechanical needs or for the needs of the crop itself. A good example is wine grapes, which have large spacing between rows of vines.

At maturity the vertical gas needs would be provided without any nuisance and interference of upwardly depending supply lines into trees, like nut trees, that have mechanical shakers that need to engage the trucks of the trees and would cut the upwardly depending supply lines.

Although the invention has been described and shown with elevated gas delivery and LED lighting integrated, it is within the purview of the invention that elevated gas delivery may be implemented independent of LED lighting, and that LED lighting may be implemented independent of elevated gas delivery.

FIG. 5 is an elevation view of an row of plants in an orchard including another alternative embodiment of the elevated system 80 of the invention including elevated, horizontal delivery tubes 82 (which may be gas only; or integrated gas/LED) and drop down lines 84 therefrom. Foils 86 may be added. If foils 86 are used, they may be stabilized by tethers 88. The drop down tube 84 may be hooked to the target trees. This system 80 also shows closed 90 and open 92 main emitters. FIG. 6 is perspective view of an orchard or grove with plural rows of plants and the elevated gas delivery tube system 80 showing plural elevated lines 82 disposed therein and supported by stands 94 communicatively connected to a main supply line 96.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An integrated gas delivery and light emitting line disposed in the foliage of one or more plants to facilitate growth, comprising an elongated, tubular body having a central, longitudinal lumen and a plurality of apertures extending from the lumen through the body, the lumen being conveying a gas and the apertures emitting gas from the lumen to the plant foliage, the body being disposed horizontally and in an elevated position with respect to the ground;

a plurality of light emitting diodes fixedly coupled to an exterior surface of the tubular body;

a conductor fixedly coupled to the tubular body and conductively connected to the plurality of light emitting diodes;

a gas source communicatively connected to the lumen of the tubular body;

a power source communicatively connected to the conductor;

at least one support connected to the gas delivery and light emitting line to hold it in an elevated position with respect to the ground;

an auxiliary gas delivery and light emitting line which extends downwardly and flexibly from the line a predetermined distance; and a ground attachable gas emitter connected to the end of the auxiliary line, the ground attachable gas emitter comprising a wind foil.

2. The integrated gas delivery and light emitting line of claim 1, wherein the line is adapted to be disposed horizontally in the plant foliage.

3. The integrated gas delivery and light emitting line of claim 2, wherein the line is adapted to be placed, and has a predetermined length which permits placement, across a plurality of plants.

4. The integrated gas delivery and light emitting line of claim 3, wherein the plants are selected from the group of plants consisting of trees in an orchard or grove and vines in a vineyard.

5. The integrated gas delivery and light emitting line of claim 1 wherein the tubular body is constructed of polyethylene.

6. The integrated gas delivery and light emitting line of claim 1, further comprising a fluid lumen, coupled and longitudinally disposed with respect to the tubular body, and adapted to transmit a fluid.

7. The integrated gas delivery and light emitting line of claim 1, wherein the gas adapted to be delivered is $CO_2$ gas.

* * * * *